April 26, 1927.
T. L. GATKE
1,626,403
FRICTION LINING AND METHOD OF FORMING SAME
Filed Aug. 15, 1923
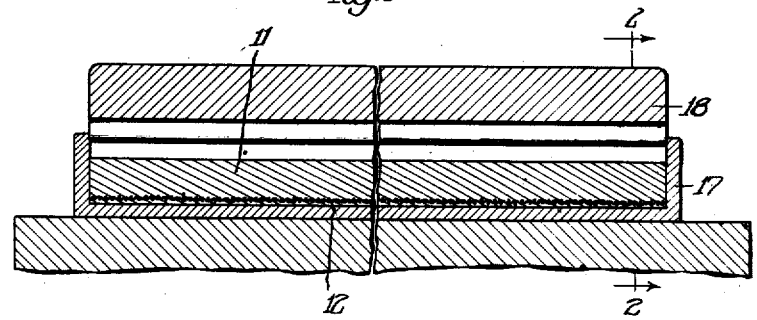
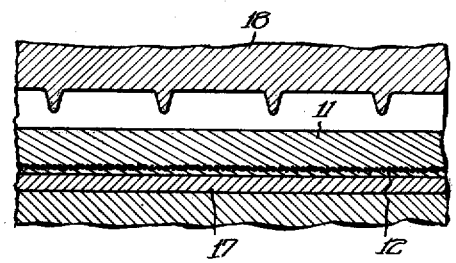
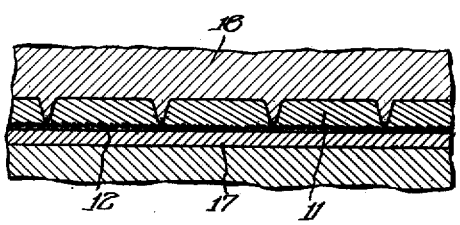
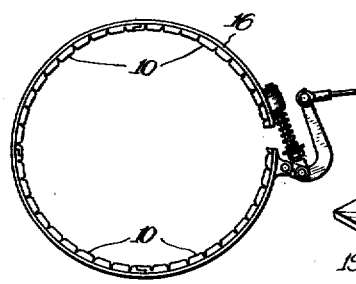
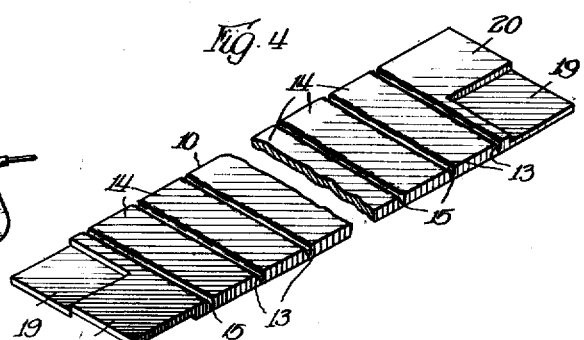
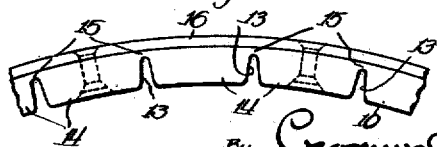
Inventor:
Thomas L. Gatke, Patented Apr. 26, 1927.

1,626,403

UNITED STATES PATENT OFFICE.

THOMAS L. GATKE, OF OAK PARK, ILLINOIS.

FRICTION LINING AND METHOD OF FORMING SAME.

Application filed August 15, 1923. Serial No. 657,590.

The invention relates to friction linings such as are adaptable for use in the facing of brakes, clutches and other similarly operating devices, and resides in a novelly constructed friction lining for association with a curved backing element.

One object of the invention is to provide a friction lining of non-flexible friction material which may be readily fitted to a backing element having any degree of curvature.

Another object of the invention is to provide a method of forming the friction lining.

The friction lining comprising the subject matter of the invention is saliently characterized by a plurality of flexibly connected non-flexible portions, and embodies a practical adaptation of a molded non-flexible friction material to a new use as a friction lining for association with a curved backing element.

While the foregoing statements are indicative of the nature of the invention, other objects and advantages not herein specifically referred to will be appreciated upon a full comprehension of the novel features presented in the construction and manner of application of the friction lining and in its method of formation.

In order that the invention may be readily understood, an exemplifying embodiment of the same is set forth in the accompanying drawing and in the following description based thereon. The invention is obviously susceptible of embodiment in other slightly varied structural formations without departure from the essence of the invention and without sacrifice of its material advantages, wherefore it is to be understood that the drawing and description are to be considered in an illustrative and not in any unnecessarily limiting sense.

In the drawing, Fig. 1 is a vertical section through a press in which a sheet of the friction lining is about to be formed, showing the press in its open position;

Fig. 2 is a vertical section on the line 2—2 of Fig. 1;

Fig. 3 is a vertical section corresponding to Fig. 2 but showing the press in its closed position;

Fig. 4 is a perspective view of a strip of the friction lining;

Fig. 5 is a side elevation of a vehicle brake band equipped with the friction lining; and Fig. 6 is an enlarged fragmentary detail based on the showing in Fig. 5.

It will be observed in the drawing that the friction lining of the invention is a molded product which is structurally adapted for association with a backing element having any degree of curvature. The friction material entering into the friction lining is preferably a non-flexible composition of asbestos and a binder, which composition is molded and cured, in a suitable press under pressure and heat treatment, into a resulting non-flexible grainless friction material having excellent frictional qualities. The composition has been used to a large extent in friction linings which are specially shaped in manufacture for the particular backing elements for which they are intended in use, but has not heretofore been successfully used with curved backing elements requiring friction linings which must conform thereto without special shaping in manufacture and subsequent fitting.

The friction material is referred to in this disclosure as being "non-flexible", but the material is not absolutely non-flexible—in the sense that it will not yield at all to bending stresses—since it will yield slightly. The degree of yield, however, is so little that, when considered in connection with yieldable friction linings of fabric and the like such as are structurally suited for ready conformation to curved elements, the material is most appropriately referred to as "non-yieldable".

The friction lining is preferably embodied as a substantially rectangular strip 10 composed of the non-flexible composition 11 above referred to and a reinforcement 12 of flexible material which is encased in the composition adjacent one face of the strip. A plurality of deep transversely disposed grooves 13 of preferably V-shaped cross-section are impressed in that face of the strip opposite the reinforcement. The grooves extend inwardly substantially to the reinforcement and are positioned in parallelism at regular intervals longitudinally of the strip, whereby to constitute, in effect, a plurality of non-flexible rectangular friction portions 14 which are arranged substantially edge-to-edge relation and are flexibly connected along one face of the strip by a plurality of short intervening webs 15 composed of the flexible reinforcement 12 encased in a thin and consequently yieldable covering of the non-flexible friction material 11.

The reinforcement 12 may consist of any suitable flexible material such as wire mesh, woven wire, metal bands, or fabric in any suitable form—the only primary requisite being flexibility combined with a certain amount of open-work to permit the friction composition 11 to flow about and encase the flexible material during the process of formation.

It will be appreciated, from the construction above described, that the strip of friction material may be readily bent at the flexible webs 15 to conform with the surface of a backing element such, for example, as a vehicle brake band 16, and that, when the strip is thus bent, the V-shaped interstices between the non-flexible portions 13 will be closed to an extent which is dependent upon the degree of curvature of the backing element and the original angles of the grooves. Under some conditions in service, it may be desirable to have the friction surface presented by the non-flexible portions 14 substantially continuous, and this may be accomplished by using a strip of the friction material which has the angles of the grooves therein unusually acute whereby to cause the portions 14 to approximately abut each other in slightly angular relation when bent at the flexible webs 15 to conform to the surface of a backing element. After the strip of friction material has been bent into substantial conformity with the surface of the backing element, it may be secured thereto by counter-sunk rivets, which is the manner in which flexible friction linings are usually attached. The outer friction surface presented by the strip of friction lining when first attached is slightly polygonal, it will be appreciated, but the rivets serve to give the approximate proper curvature to the sections with which associated and the heat and pressure incident to the initial applications of the break or clutch to the lining serves to re-mold and cure the lining in substantially perfect form for use.

The method presented for forming the friction lining consists in placing a preferably large sheet of the reinforcement 12 in the bottom receptacle-like portion 17 of any suitable molding press, placing a correspondingly sized sheet of the previously compounded friction material in a plastic condition on the reinforcement, and closing the top transversely ribbed portion 18 of the press down on the material under such a high pressure, with such heat, and for such a time as is necessary to effect the proper curing of the friction material. This press operation and treatment forms the contents of the press into a unified sheet of friction material composed of a plurality of flexibly connected non-flexible portions. The sheet may then be cut into a plurality of the strips 10.

During the forming operation, the composition is flowed through and about the meshes of the reinforcement to encase completely the same, and is solidified into a hard grainless non-flexible and non-heat conducting friction material. Under some circumstances it may be found desirable to place the reinforcement on the top of the friction material in the press instead of placing the material on the reinforcement as above described.

The friction material, when in use, is placed with the reinforcement side of the same against the curved face of the backing element to which the strip is attached whereby to present outwardly to the brake drum or other co-acting element of the device with which associated a plurality of closely arranged friction blocks having interstices therebetween. The interstices advantageously serve to maintain the friction surfaces clear of detrimental foreign matter by providing numerous points of egress for such matter. The friction material functions in an extremely efficient manner to dissipate the heat generated by the friction and to hold the opposed relatively movable elements of the device with which associated against movement with a positive cushioning action devoid of any sudden gripping or slipping. Owing to its novel construction, the friction lining may be readily conformed to a backing element having any degree of curvature with the facility experienced in applying the usual flexible fabric friction lining to a curved backing element.

In order to provide a strip of the friction lining for use with a backing element which is longer than a single strip as produced, two or more of the strips may be spliced together at adjoining ends. For this purpose the strips as produced may be provided at each of their ends with two tongues 19 and 20 which project in the same direction and are arranged at opposite sides and flush with opposite faces of the strips. By this arrangement the tongues on the end of any strip will interfit with those on the adjoining end of the next strip and will present a neat connection which does not necessitate a joint at one place that extends entirely across the width of the strips.

I claim:

1. A strip of friction lining composed of a plurality of relatively non-flexible portions integrally connected with each other by means of a plurality of flexible intervening webs of a reinforcing material incorporated in the non-flexible portions.

2. A strip of friction lining composed of a plurality of relatively non-flexible portions integrally connected with each other by means of a plurality of flexible intervening webs of a reinforcing material incorporated in the non-flexible portions, said webs being disposed flush with one face of the strip.

3. A strip of friction lining composed of a plurality of relatively long and thick non-flexible portions integrally connected with each other by means of a plurality of relatively short and thin flexible webs of a reinforcing material incorporated in the non-flexible portions.

4. A strip of friction lining composed of a plurality of relatively long and thick non-flexible portions integrally connected with each other by means of a plurality of relatively short and thin flexible webs of a reinforcing material incorporated in the non-flexible portions, said webs being disposed flush with the rear face of the strip.

5. A strip of friction lining composed of a plurality of relatively non-flexible portions of a molded friction material connected by a plurality of flexible webs of a reinforcing material molded integrally with the material within the regular contour of the strip.

6. A strip of friction lining composed of a plurality of relatively non-flexible portions of a friction material connected by a plurality of flexible webs of wire mesh covered with the friction material.

7. A strip of friction lining of generally uniform thickness having a plurality of parallel grooves extending transversely in one face of the strip, whereby to constitute a plurality of closely arranged non-flexible rectangular portions between the grooves connected by a plurality of flexible webs at the grooves.

8. A strip of friction lining of generally uniform thickness having a plurality of parallel narrow inwardly converging grooves extending transversely in one face of the strip at regular intervals longitudinally of the same, whereby to constitute a plurality of relatively long and thick non-flexible portions between the grooves connected by a plurality of relatively short and thin flexible webs disposed flush with one face of the strip at the grooves.

9. A strip of non-flexible friction material, a reinforcement of flexible material in the strip adjacent one face of the same, and a plurality of grooves extending transversely in the other face of the strip with their bottoms adjacent the reinforcement, whereby to constitute a plurality of flexibly connected relatively non-flexible portions having interstices therebetween.

10. A method of forming a flexible strip of friction lining with non-flexible friction material, which consists in molding under pressure a quantity of non-flexible friction material about a reinforcement of flexible material disposed in the friction material adjacent one face of the same, and forming transverse grooves at regular intervals in the other face of the friction material with the bottoms of the grooves adjacent the reinforcement.

11. A relatively long and narrow one-piece strip of friction material for lining contiguously a curved backing element, characterized by a plurality of grooves in the friction material extending at regular intervals from one side of the strip to the other in the friction face of the same to dissipate heat, to receive foreign matter from the friction face, and to facilitate conformation of the strip to the curvature of the backing element, the grooves being so proportioned as to occupy but relatively small portions of the strip, and the portions of the strip between the grooves being substantially uniform in thickness from groove to groove to present extended friction surfaces.

In witness whereof I have hereunto signed my name.

THOMAS L. GATKE.

a plurality of relatively non-flexible portions integrally connected with each other by means of a plurality of flexible intervening webs of a reinforcing material incorporated in the non-flexible portions, said webs being disposed flush with one face of the strip.

3. A strip of friction lining composed of a plurality of relatively long and thick non-flexible portions integrally connected with each other by means of a plurality of relatively short and thin flexible webs of a reinforcing material incorporated in the non-flexible portions.

4. A strip of friction lining composed of a plurality of relatively long and thick non-flexible portions integrally connected with each other by means of a plurality of relatively short and thin flexible webs of a reinforcing material incorporated in the non-flexible portions, said webs being disposed flush with the rear face of the strip.

5. A strip of friction lining composed of a plurality of relatively non-flexible portions of a molded friction material connected by a plurality of flexible webs of a reinforcing material molded integrally with material within the regular contour of the strip.

6. A strip of friction lining composed of a plurality of relatively non-flexible portions of a friction material connected by a plurality of flexible webs of wire mesh covered with the friction material.

7. A strip of friction lining of generally uniform thickness having a plurality of parallel grooves extending transversely in one face of the strip, whereby to constitute a plurality of closely arranged non-flexible rectangular portions between the grooves connected by a plurality of flexible webs at the grooves.

8. A strip of friction lining of generally uniform thickness having a plurality of parallel narrow inwardly converging grooves extending transversely in one face of the strip at regular intervals longitudinally of the same, whereby to constitute a plurality of relatively long and thick non-flexible portions between the grooves connected by a plurality of relatively short and thin flexible webs disposed flush with one face of the strip at the grooves.

9. A strip of non-flexible friction material, a reinforcement of flexible material in the strip adjacent one face of the same, and a plurality of grooves extending transversely in the other face of the strip with their bottoms adjacent the reinforcement, whereby to constitute a plurality of flexibly connected relatively non-flexible portions having interstices therebetween.

10. A method of forming a flexible strip of friction lining with non-flexible friction material, which consists in molding under pressure a quantity of non-flexible friction material about a reinforcement of flexible material disposed in the friction material adjacent one face of the same, and forming transverse grooves at regular intervals in the other face of the friction material with the bottoms of the grooves adjacent the reinforcement.

11. A relatively long and narrow one-piece strip of friction material for lining contiguously a curved backing element, characterized by a plurality of grooves in the friction material extending at regular intervals from one side of the strip to the other in the friction face of the same to dissipate heat, to receive foreign matter from the friction face, and to facilitate conformation of the strip to the curvature of the backing element, the grooves being so proportioned as to occupy but relatively small portions of the strip, and the portions of the strip between the grooves being substantially uniform in thickness from groove to groove to present extended friction surfaces.

In witness whereof I have hereunto signed my name.

THOMAS L. GATKE.

CERTIFICATE OF CORRECTION.

Patent No. 1,626,403.     Granted April 26, 1927, to

THOMAS L. GATKE.

It is hereby certified that error appears in the printed specification of the above numbered patent requiring correction as follows: Page 3, line 27, claim 5, before the word "material" insert the words "the fiction"; and that the said Letters Patent should be read with this correction therein that the same may conform to the record of the case in the Patent Office.

Signed and sealed this 7th day of June, A. D. 1927.

Seal.             M. J. Moore,
Acting Commissioner of Patents.

CERTIFICATE OF CORRECTION.

Patent No. 1,626,403.                                  Granted April 26, 1927, to

THOMAS L. GATKE.

It is hereby certified that error appears in the printed specification of the above numbered patent requiring correction as follows: Page 3, line 27, claim 5, before the word "material" insert the words "the friction"; and that the said Letters Patent should be read with this correction therein that the same may conform to the record of the case in the Patent Office.

This Certificate supersedes Certificate of Correction issued June 7, 1927.

Signed and sealed this 21st day of June, A. D. 1927.

M. J. MOORE.
Seal.                                                  Acting Commissioner of Patents.

CERTIFICATE OF CORRECTION.

Patent No. 1,626,403.  Granted April 26, 1927, to

THOMAS L. GATKE.

It is hereby certified that error appears in the printed specification of the above numbered patent requiring correction as follows: Page 3, line 27, claim 5, before the word "material" insert the words "the friction"; and that the said Letters Patent should be read with this correction therein that the same may conform to the record of the case in the Patent Office.

This Certificate supersedes Certificate of Correction issued June 7, 1927.

Signed and sealed this 21st day of June, A. D. 1927.

Seal.

M. J. MOORE.
Acting Commissioner of Patents.